United States Patent
Haussmann

(10) Patent No.: US 8,967,233 B2
(45) Date of Patent: Mar. 3, 2015

(54) LATENT COLD STORAGE DEVICE

(75) Inventor: Roland Haussmann, Wiesloch (DE)

(73) Assignee: Valeo Klimasysteme GmbH, Bad Rodach (DE)

( * ) Notice: Subject to any disclaimer, the term of this patent is extended or adjusted under 35 U.S.C. 154(b) by 781 days.

(21) Appl. No.: 12/441,789

(22) PCT Filed: Sep. 20, 2007

(86) PCT No.: PCT/EP2007/060007
§ 371 (c)(1),
(2), (4) Date: Sep. 4, 2009

(87) PCT Pub. No.: WO2008/034887
PCT Pub. Date: Mar. 27, 2008

(65) Prior Publication Data
US 2010/0012289 A1    Jan. 21, 2010

(30) Foreign Application Priority Data
Sep. 22, 2006   (DE) .......................... 10 2006 044 932

(51) Int. Cl.
*F23L 15/02*   (2006.01)
*F28D 17/00*   (2006.01)
*F28F 7/00*    (2006.01)
(Continued)

(52) U.S. Cl.
CPC ................ *F28D 20/021* (2013.01); *F28D 7/08* (2013.01); *F28D 7/085* (2013.01); *F28F 1/32* (2013.01); *F28F 21/067* (2013.01); *F28F 21/08* (2013.01); *F28F 2275/085* (2013.01); *Y02E 60/145* (2013.01); *F28F 2225/00* (2013.01); *F28F 2265/14* (2013.01)

USPC ........ 165/10; 165/4; 165/7; 165/46; 165/168; 165/170

(58) Field of Classification Search
CPC ..... F28D 20/021; F28D 7/08; F28D 2265/14; F28D 2275/085; Y02E 60/145
USPC .............................. 165/10, 4, 7, 46; 275/618
See application file for complete search history.

(56) References Cited

U.S. PATENT DOCUMENTS 4,073,514 A * 2/1978 Pate ........................... 285/149.1
4,570,883 A * 2/1986 Wepfer .......................... 248/49
(Continued)

FOREIGN PATENT DOCUMENTS

DE      19839995 A1     3/2000
DE      19857121 A1     6/2000
(Continued)

OTHER PUBLICATIONS

English language abstract for DE 19839995 extracted from espacenet.com database, dated Sep. 15, 2009.
(Continued)

*Primary Examiner* — Alexandra Elve
*Assistant Examiner* — Henry Crenshaw
(74) *Attorney, Agent, or Firm* — Howard & Howard Attorneys PLLC

(57) ABSTRACT

The invention relates to a latent cold storage device with an improved structure and an improved mode of operation by means of a sandwich-type arrangement of the heat conducting elements and cold storage elements, whereby the cold storage elements made in the form of pockets containing a cold storage medium, are deformable.

15 Claims, 8 Drawing Sheets

(51) Int. Cl.
*F28F 3/12* (2006.01)
*F28F 3/14* (2006.01)
*F28D 20/02* (2006.01)
*F28D 7/08* (2006.01)
*F28F 1/32* (2006.01)
*F28F 21/06* (2006.01)
*F28F 21/08* (2006.01)

(56) References Cited

U.S. PATENT DOCUMENTS

| | | | |
|---|---|---|---|
| 5,211,900 A * | 5/1993 | Ziegler | 264/263 |
| 5,239,839 A * | 8/1993 | James | 62/434 |
| 5,680,898 A * | 10/1997 | Rafalovich et al. | 165/236 |
| 5,935,486 A * | 8/1999 | Bell et al. | 252/70 |
| 6,343,485 B1 * | 2/2002 | Duerr et al. | 62/434 |
| 7,000,681 B2 * | 2/2006 | Lang et al. | 165/10 |
| 2005/0028966 A1 * | 2/2005 | Pickard | 165/168 |

FOREIGN PATENT DOCUMENTS

| | | |
|---|---|---|
| DE | 20208898 U1 | 10/2002 |
| DE | 10242463 A1 | 3/2004 |
| EP | 0510263 A1 | 10/1992 |
| JP | 58195792 A | 11/1983 |

OTHER PUBLICATIONS

English language abstract for DE 19857121 extracted from espacenet.com database, dated Sep. 15, 2009.
English language abstract for DE 20208898 extracted from espacenet.com database, dated Sep. 15, 2009.
English language abstract for DE 10242463 extracted from espacenet.com database, dated Sep. 15, 2009.
English language abstract for EP 0510263 extracted from espacenet.com database, dated Sep. 15, 2009.
English language abstract for JP 58195792 extracted from espacenet.com database, dated Sep. 15, 2009.
PCT International Search Report for PCT/EP2007/060007, dated Jan. 31, 2008, 2 pages.

* cited by examiner

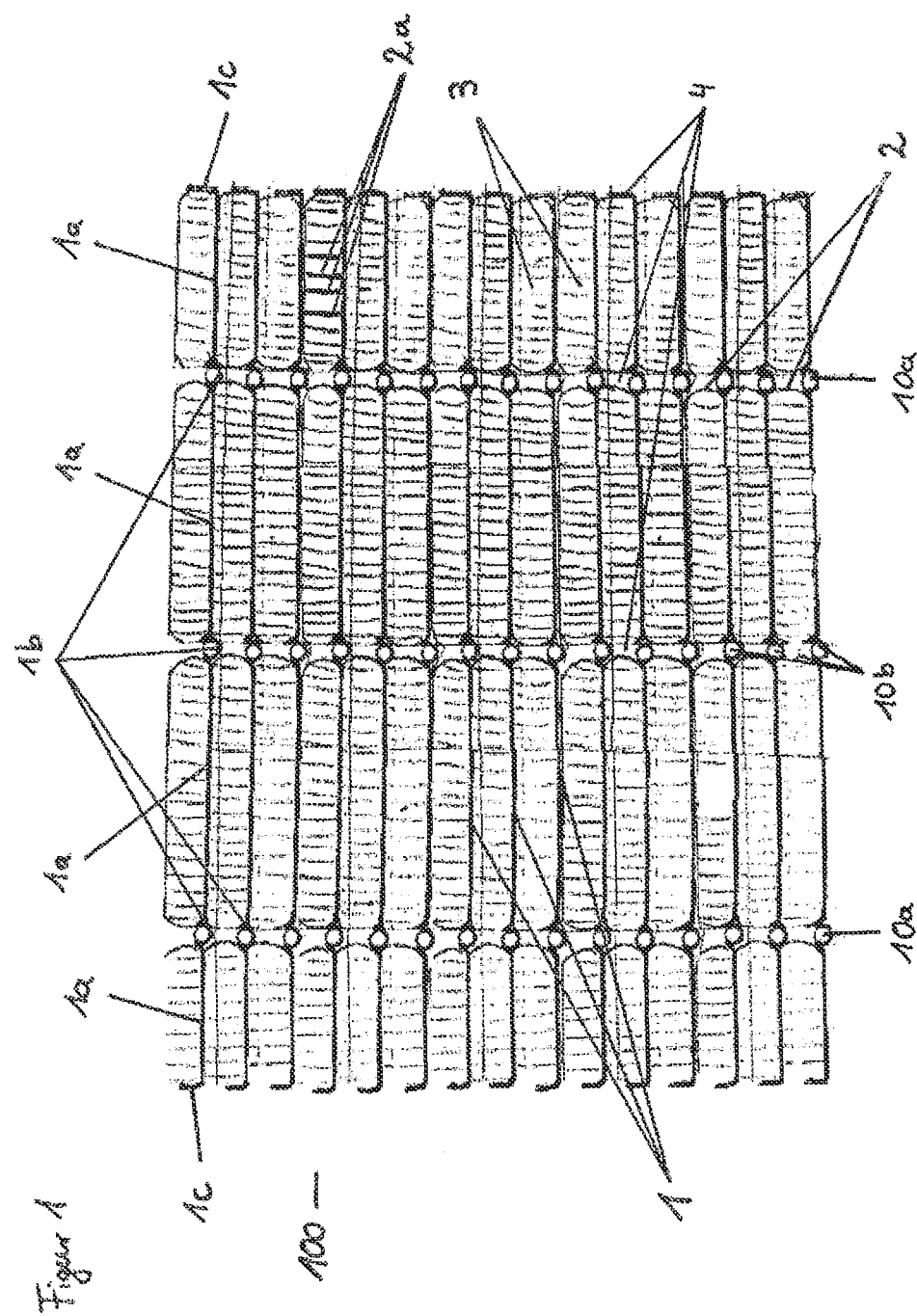

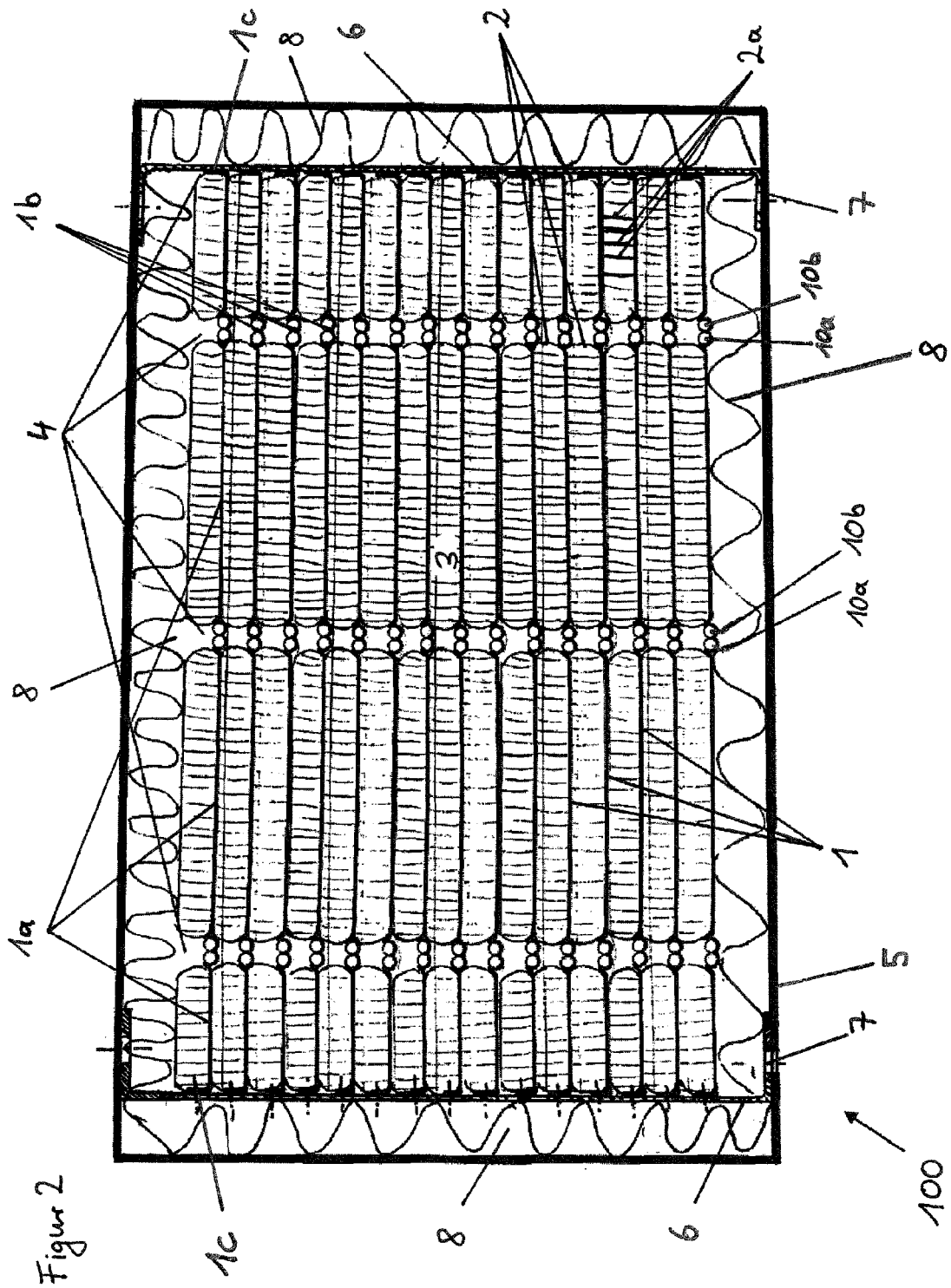

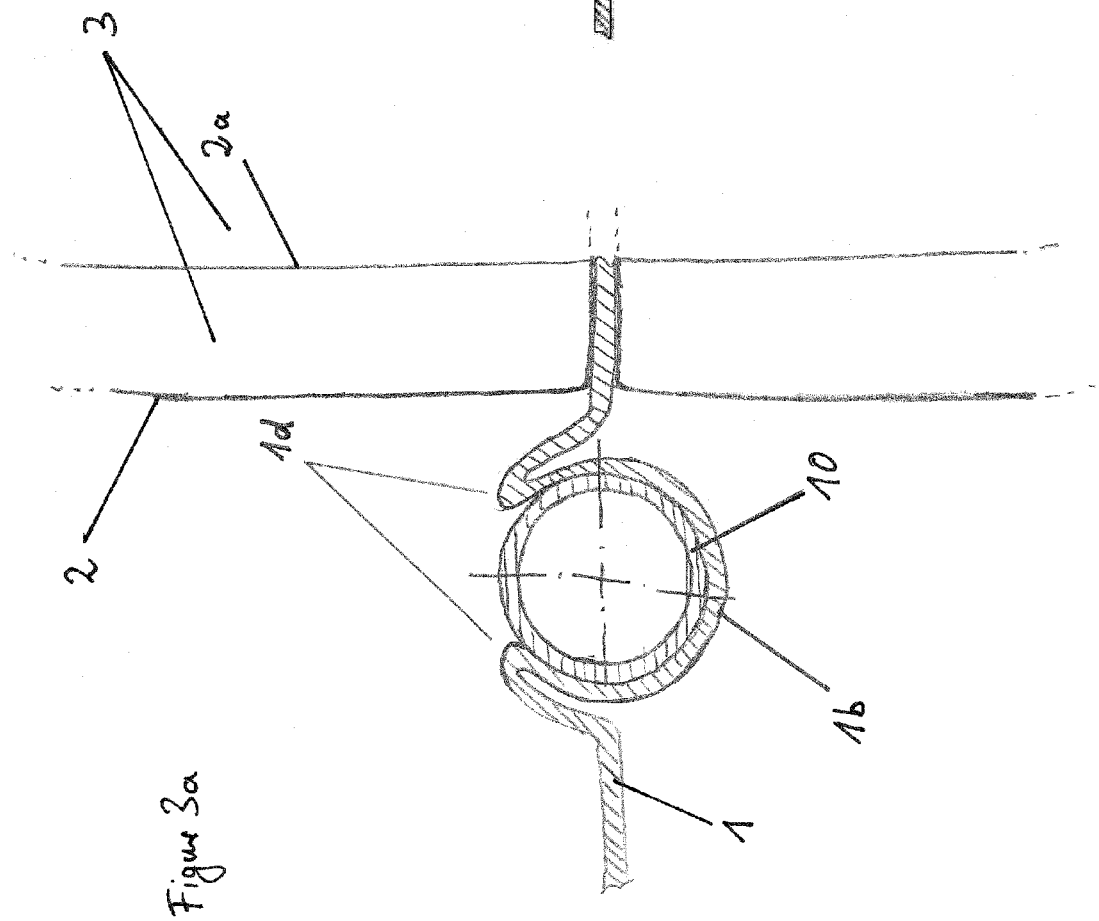
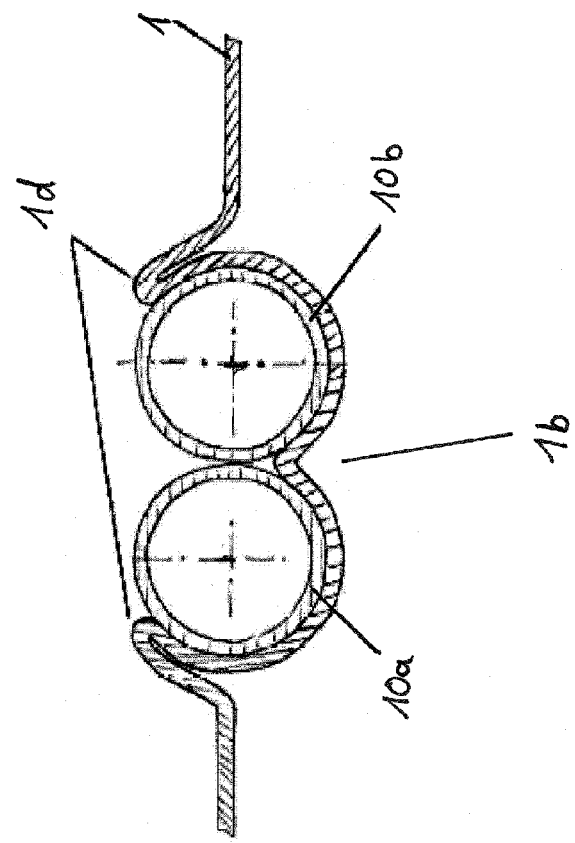

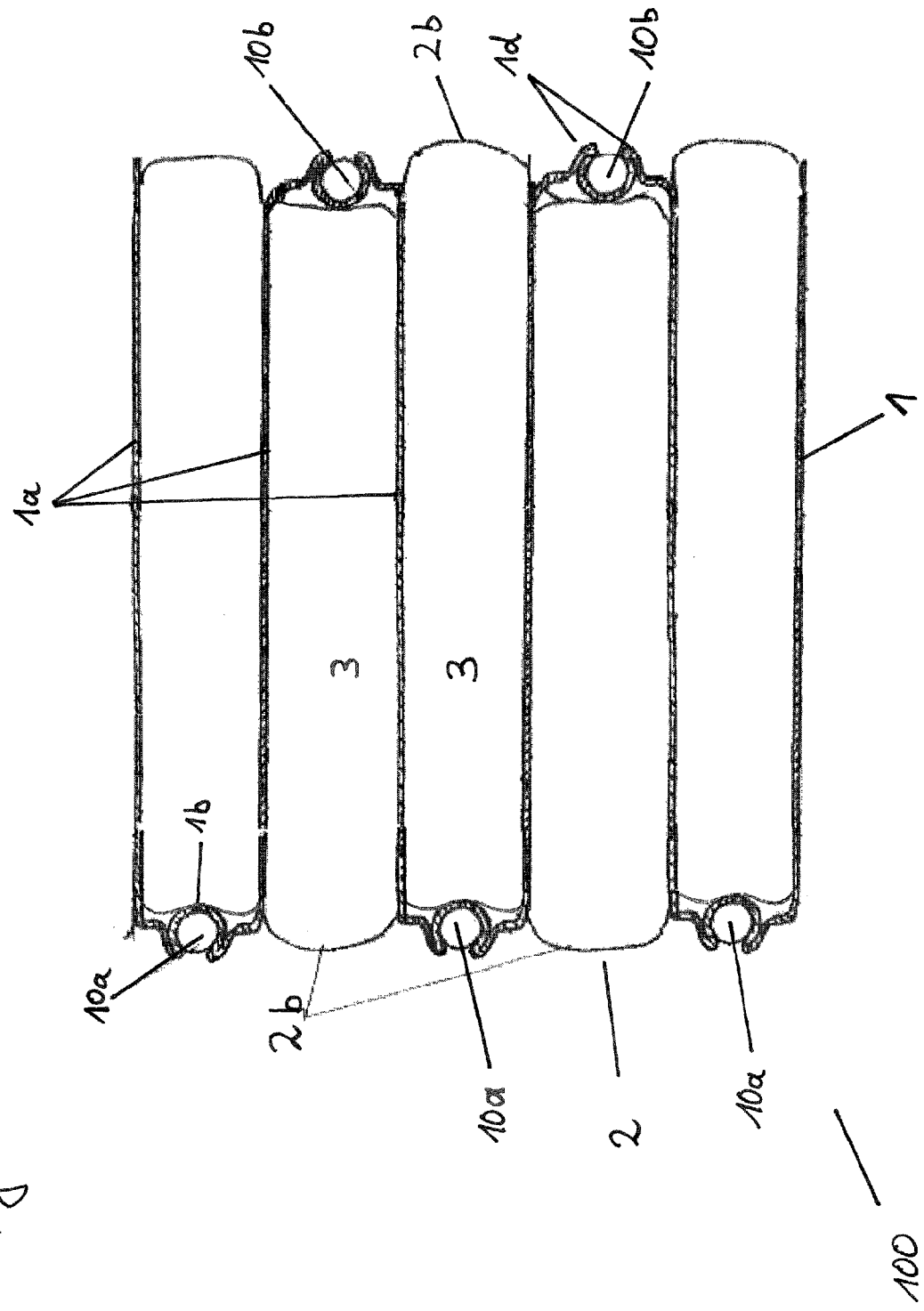

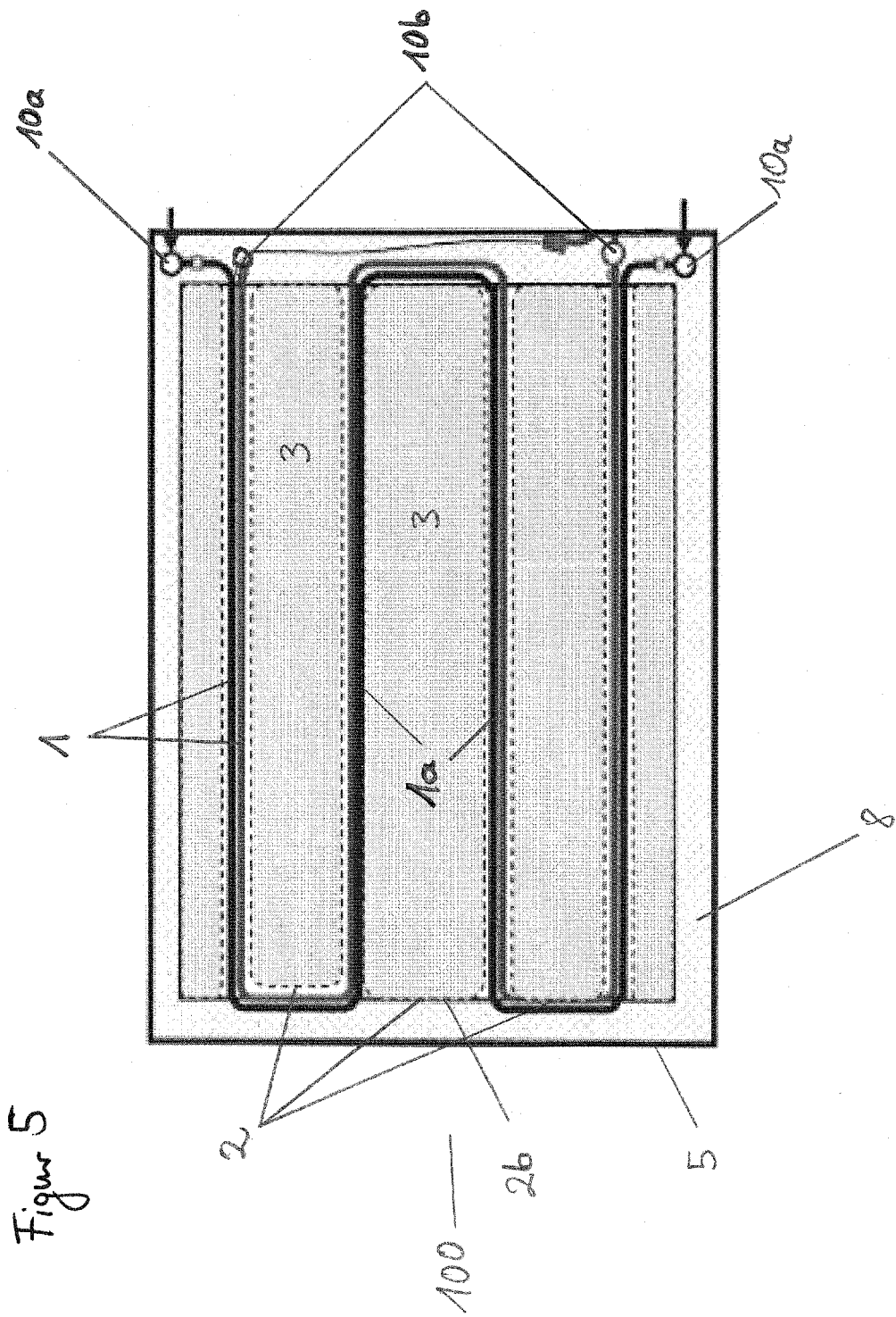

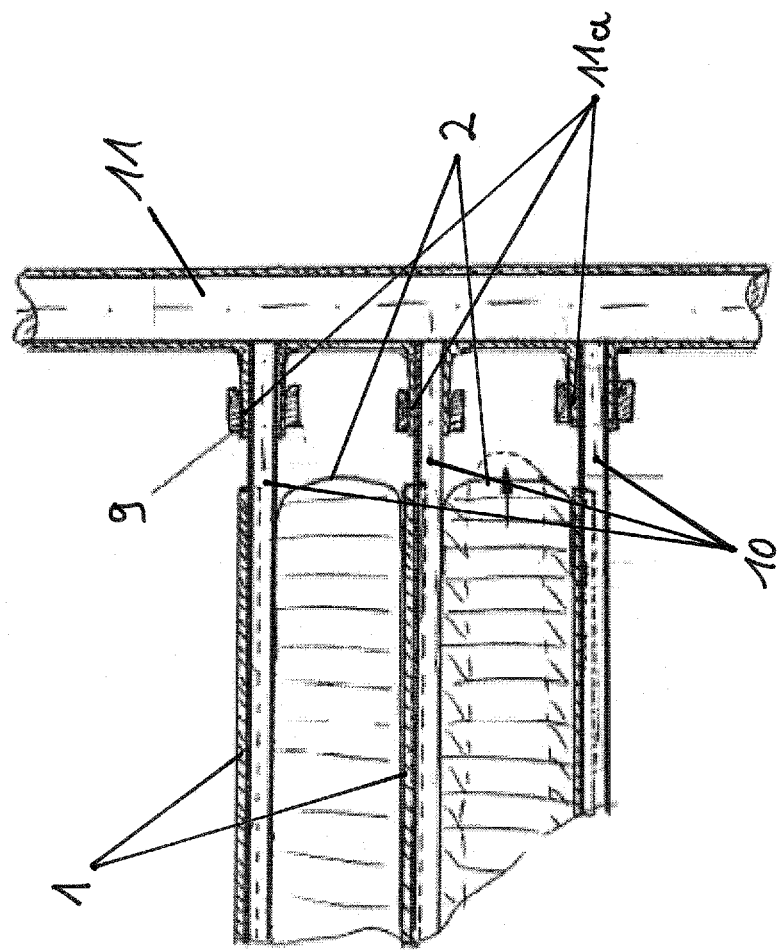

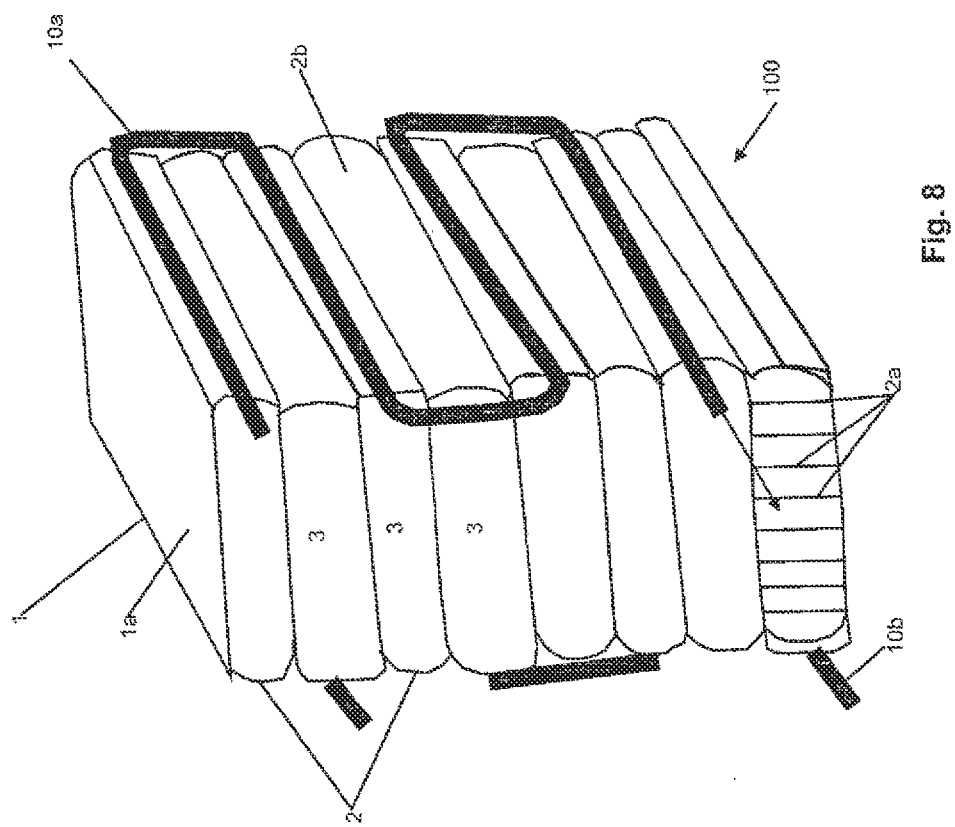

LATENT COLD STORAGE DEVICE

RELATED APPLICATIONS

This application claims priority to and all the advantages of International Patent Application No. PCT/EP 2007/060007, filed on Sep. 20, 2007, which claims priority to German Patent Application No. 10 2006 044 932.0, filed on Sep. 22, 2006.

The invention relates to a latent cold storage device, as used for example in the vertical air conditioning of a vehicle.

Cold storage or latent cold storage systems with integrated latent cold storage devices, which are frequently used in the relevant vertical air conditioning systems of vehicles, in particular of commercial vehicles, on the one hand, serve above all to give occasional additional support to the cooling capacity generated by an original, conventional, standard air conditioning system powered by a standard drive assembly, in order to provide the above average cooling capacity necessary for the car interior. On the other hand, the cold energy or cold stored, for example during the journey, in the cold storage elements of a latent cold storage device is used during idle times, i.e. when the combustion engine is switched off during the night within the scope of the operation of the vertical air conditioning system for the air conditioning of a sleeping cabin. The generation, storage and retrieval, i.e. transport of the cold to the cold storage elements of a cold storage element is based on a universally known procedure or cycle for a vertical air conditioning system, which however, is basically dependent on the circuit components and in particular the design and embodiment of the latent cold storage device.

Hereinafter, already available latent cold storage devices representative of the state of the art are briefly examined and their typical characteristics analysed, interpreted and assessed.

From DE 198 39 995 A1, a frost storage unit made of light-weight plastic, functioning as a latent cold storage device for the vertical air conditioning system of a motor vehicle is known, which consists of a hollow body provided for cold storage purposes which on the one hand is partly filled with a frost storage medium liquid in the thawed state and partly with air. The increase in volume of the storage medium caused by the freezing process, i.e. with the charging of the storage device, is counteracted in order to prevent the destruction of the hollow body by the freezing process, in that the air bubble also trapped or contained in the hollow body serves as compensatory equalising volume. However, the contact surface is too small for an exchange of heat for the conveyance of the refrigerating agent in the solution indicated in order to ensure the required cooling capacity and dynamics of the system in terms of charging and discharging, since furthermore the resistance to the transfer via the relevant plastic materials is also very high. It should be added that this entails a relatively large execution.

With DE 102 42 463 A1, a cold/heat storage device equipped with several disc-shaped stacked storage units for a storage medium liquid in the thawed state is proposed, whereby the storage units are connected conducting heat and via the heat transfer tubes designed as flat tubes, which cover a large area between the stacked storage units and run in a correspondingly meandering configuration. The storage units of the cold/heat storage device consist in this case of a graphite matrix material in the pores of which water can penetrate and collect. Moreover, the cold/heat storage device is enclosed in a suitable housing which is designed for stability in order to provide the required protective and insulating function. The latent cold storage device published in this document attaches considerable importance to the use of graphite and the water storage characteristic connected therewith. Apart from high manufacturing costs and not yet proven long-term stability of the storage medium of the type mentioned, in addition, the thermodynamic active or contact surfaces for heat exchange between the storage units and the relevant heat transfer tubes for charging and discharging the storage body are minimal.

From DE 198 57 121 A1, a cold storage device is known which consists of a housing and among other things encloses a plurality of chambers which are tightly shut and contain a storage medium. Between two neighbouring chambers, which have a flat cross section, there is respectively a duct which conveys a heat transfer medium. In the chambers, there is a gaseous residual volume in addition to the storage medium. The ducts are in this case connected to the housing via a common distribution and collection chamber, whereby the distribution and collection chamber have an inlet connection and a return connection. In this way, since the heat transfer medium must flow through the channels provided for this purpose both for the charging and discharging process, an additional exchange of heat is required in order to charge the cold storage unit. As a result, an evaporator temperature must be lower for charging which reduces the efficiency of the entire system and allows the fuel consumption to increase proportionately. Moreover, the cold storage device published in this document has relatively high underlying manufacturing costs, as leak-tight brazing processes are needed on the chambers and flat ducts as well as the internal partitioning.

In view of the state of the art, the aim of the present invention consists of proposing a latent cold storage device which, for example is used in the relevant vertical air conditioning systems of vehicles, which on the one hand presents reduced weight and advantageous structural characteristics, as well as on the other hand enabling a more efficient mode of operation in respect of the charging and discharging of cold storage units in the latent cold storage device.

This aim is achieved by the characteristics of independent patent claim 1, whereby practical embodiments are described by the characteristics of the dependent claims.

According to the invention therefore, a latent cold storage device is provided, which can be used advantageously for, or form an integral part of, vertical air conditioning systems in vehicles, wherein packing which can be deformed into pockets which contain a cold storage medium for the storage of cold energy, form cold storage elements, of which at least two are arranged to form a sandwich-type configuration in respect of a heat conducting element. In this way, in that elastic deformable pockets are provided for the conservation of the cold storage medium for the storage of cold energy in a latent cold storage device in accordance with the invention, which are filled with the cold storage medium and therefore form cold storage elements, a series of advantages is offered with respect to the various previously known latent cold storage devices. On the one hand, with this type of version of the cold storage element, with regard to the deformation behaviour, the danger of rupture or bursting and leakage is not present or is avoided, since the packing provided for the cold storage medium in the form of the elastic pocket adapts itself according to the volume required of the cold storage medium. As is known, particularly during the charging process of the cold storage elements of a latent cold storage device, i.e. on removal of the heat from the cold storage medium of the cold storage elements, a corresponding increase in volume of the cold storage medium takes place, which can destroy an unfavourable embodiment of the packing of the circuit medium which also renders the latent cold storage device unusable. With regard to the surrounding ambient marginal conditions of a cold storage element in the form of surfaces, with which the cold storage element essentially comes into contact and through which the exchange of heat on charging and discharging the cold storage element takes place, with a cold storage element in the form of a pocket as suggested here, it is possible to achieve an optimal, spatial adaptation of the cold storage element, which in this way via the relevant active surfaces further improves the relevant heat exchange processes. The layout of the cold storage elements and heat conducting elements in a sandwich-type configuration therefore ensures great packing density of these active components, which optimise the space available.

Advantageously, the heat conducting element contains at least one plate-shaped section. This gives a good connection to adjacent cold storage elements in the form of filled pockets, which therefore gives rise to an improved mode of operation in the form of the heat exchange during charging and/or discharging of the cold storage elements. Apart from the increased efficiency, this also provides an additional advantage with regard to the manufacture of the heat conducting element, which in this way can be accomplished simply and cost effectively, for example via a forging, deep-drawing, moulding, or rolling process.

Preferably, in a latent cold storage device in accordance with the invention, at least one heat conducting elements has a serpentine design. This enables improved heat exchange between the heat conducting element and the cold storage element, since the pocket shaped, cold storage elements may be integrated in the relevant sections or areas of the serpentine active element in the optimal manner, i.e. by filling the available space. For example, this could be understood to include a right angled structure in sections, with alternating and offset opposing transfer areas, comprising an arrangement of parallel, plate-shape sections at a distance of the height of the heat storage element.

Preferentially, the latent cold storage device in accordance with the invention contains, for at least one cold storage element, at least one expansion area. This guarantees the possibility of unimpeded deformation of the cold storage element(s), above all during the charging process and the accompanying increase in volume or the increased space requirement for the cold storage element, due to the cold storage medium. Advantageously, the expansion area for example is between adjacent cold storage elements or between at least one cold storage element and at least one housing wall or between at least one cold storage element and at least one tube conveying the circuit medium.

Preferentially, at least one tube conveying the circuit medium in a latent cold storage device in accordance with the invention, which serves to charge and/or discharge the cold storage elements, is at least partially connected to the heat conducting element. In this way, this gives rise to the advantage of an increased contact area between the tubes conveying the circuit medium and the heat conducting element(s), whereby the heat to be removed from the cold storage medium while charging the cold storage elements, for example, is removed directly via the heat conducting element by the relevant tubing.

At least one tube in a latent cold storage device in accordance with the invention is preferably engaged in this case in a positively interlocking manner and/or frictionally engaged with the heat conducting element. The resulting advantage can also be seen, for example, in terms of increased efficiency of the latent cold storage device during the charging process of the cold storage elements. Those skilled in the art will recognise, naturally, that an integral embodiment of the heat conducting element with the relevant tubing is conceivable or can be created.

Preferentially, a heat conducting element of a latent cold storage element in accordance with the invention contains at least one projection, which serves to improve at least one connection of a tube with the heat conducting element. For example, this refers to a section formed for the acceptance or securing of a tube conveying the circuit medium in a heat conducting element which extends in the relevant form, or preferably bends itself to the contours of the tubing conveying the circuit medium.

Advantageously, in a latent cold storage device in accordance with the invention, tubing of the same circuit (charging or discharging circuit) is distributed in a multiple parallel arrangement on a heat conducting element. Apart from an adjacent arrangement of the tubing for charging and/or discharging the cold storage elements, such a configuration of the tubing improves the respective mode of operation of the charging and/or discharging of the cold storage elements of the latent cold storage device in accordance with the invention. Preferentially, the distance between the tubing is within the range of 6 mm to 20 mm, in particular in the range between 8 mm and 14 mm.

Preferentially, at least one tube for charging and/or discharging the cold storage elements is situated essentially in at least one area of expansion. In this way, on the one hand, there is a design which is simple to manufacture; on the other hand there is, for example, the possibility, on suitable deformation of the cold storage elements during the charging process, that additional contact surfaces between the cold storage elements and the tubing conveying the circuit medium occur.

Advantageously, at least one tube of a latent cold storage device adjoins the end zone of a cold storage element or a pocket. In this way, on the one hand, it is possible to achieve a simple structure or an advantageous design, on the other hand, at least two cold storage elements on a tube can be actuated with regard to the heat exchange process.

Preferentially, at least one tube is connected by means of at least one fixing device with at least one connecting tube. In this way, above all, a compact design is obtained which in addition also saves extra weight, since it is possible to dispense with a complicated system of tubing thanks to the common connecting tube provided.

Advantageously, the fixing device of a latent cold storage device according to the invention comprises a compression ring. In this way, compared to the usual welding or soldering processes or other conceivable fixing devices, it is possible above all to obtain a faster and more cost effective assembly or mounting process.

Preferentially, at least one serpentine-shaped tube for conveying the circuit medium is created between at least two cold storage elements. Such a latent cold storage device made in this way displays above all an advantageous uniform temperature distribution, in particular in the relevant cold storage elements, since at least two surfaces of the tubing are enclosed.

Preferentially, in a latent cold storage device according to the invention at least one heat conducting element and at least two cold storage elements are connected in a sandwich-like arrangement with at least one support. The support in this case is preferentially, for example, made in the form of a bracket, onto which the heat conducting element is, for example, welded, soldered or screwed down. Naturally, to make the connection between the heat conducting element and the support, other fixing devices or procedures necessary for this purpose would also be conceivable. The integration of such a support, on the one hand, increases the required stability of the structure of latent cold storage device according to the invention; moreover, on the other hand, the possibility to assemble on a structure of the latent cold storage device provided for this purpose is already provided. By means of such an advantageous embodiment, sufficient stability of the structure or of the design of the latent cold storage element is already provided, so that the housing no longer has to fulfil the essential part of this function and therefore can be made of plastic, for example, which gives an advantage regarding weight.

At least one support for a latent cold storage unit in accordance with the invention proves to be advantageous for fixing devices to a structure provided for this purpose. These devices can be made for example advantageously as holes drilled for screws or internal threads for the relevant threaded bolts. However, any other devices, mechanism or process for fixing would also be conceivable.

Preferentially, at least one cold storage element, of a latent cold storage device in accordance with the invention, is made of aluminium or copper. Materials of this type display high thermal conductivity, which is of advantage for the relevant heat exchange processes during charging and/or discharging of the cold storage elements. Moreover, these types of materials can be processed easily and cost effectively and can be recycled or reused at the end of the product life cycle of the latent cold storage device.

Advantageously, the pockets of the cold storage elements of a latent cold storage device according to the invention are made of plastic. This ensures, on the one hand, the necessary flexibility in respect of the increased space requirement for the cold storage medium while charging the cold storage unit, i.e. during the freezing process. On the other hand, the space available for the cold storage medium in these types of packings can be optimised, since filling with a gas for compensation purposes is no longer necessary. Furthermore, such a version of the pockets, apart from the good extension and deformation behaviour, enables a simple manufacturing process as well as the necessary air-tightness. Advantageously, such types of pocket made of plastic have a side thickness in the range of 0.05 mm to 0.5 mm.

Preferentially, at least one pocket of at least one cold storage element has least one internal partition. In this way, above all, the structure of the pocket of this type is altered or improved, so that increased stability in the design of a latent cold storage device in accordance with the invention is achieved.

Advantageously, the latent cold storage unit according to the invention is enclosed by a housing with a top area, a lateral area and a cover area. By means of a latent cold storage device integrated in the housing in this way, assembly can essentially be simplified or even automated. Moreover, such a housing protects the latent cold storage device from foreign substances, such as corrosive fluids. In addition, such a housing helps the structure or the design of the latent cold storage device to attain further, extra stability and resistance to vibrations, for example.

Advantageously, an intermediate area between the housing and the latent cold storage device made of foam material is provided. In this way, insulation which is advantageous from the point of view of lower losses in terms of vibration and/or noise is provided for example, which also furthers the stability of the latent cold storage device.

Furthermore, advantageously, the tubes connected with the serpentine-shaped heat conducting element for charging and/or discharging the cold storage units, for example, are arranged in the area of the lateral walls of the cold storage element, which in this embodiment are also in contact with the transfer areas of the serpentine-shaped heat conducting element. Once again, this results in an improvement in the heat exchange between the heat conducting element and the cold storage medium present in the pockets of the cold storage elements.

The invention relates to a latent cold storage device, which is characterised above all by the advantages of an efficient design or an optimum structure as well as a more efficient mode of operation.

Further characteristics and advantages of the invention emerge from the following description of embodiments of the invention with reference to the attached figures which however, should be considered as merely exemplary and in no way limitative.

The following are shown:

FIG. 1 shows an example of an embodiment of a latent cold storage device in accordance with the invention (100) in a cutting plane;

FIG. 2 shows an example of an embodiment of a latent cold storage device according to the invention (100) with a housing (5) and supports (6) in a cutting plane;

FIGS. 3a, 3b show a cross section of a fixing device for tubing conveying the circuit medium (10) to a heat conducting element (1)

FIG. 4 shows an example of an embodiment of a latent cold storage device according to the invention (100) in a cutting plane with a serpentine shaped heat conducting element (1);

FIG. 5 shows an example of an embodiment of a latent cold storage device according to the invention (100) in a side view with two serpentine-shaped, overlaying heat conducting element (1);

FIG. 7 shows a section represented in cross section of an example of an embodiment of a latent cold storage device according to the invention (100) with a fixing device (9) for tubing conveying the circuit medium in circulation (10) to a common connecting tube (11);

FIG. 8 shows a three dimensional representation of an example of an embodiment of a latent cold storage device according to the invention (100) in a perspective view with serpentine-shaped tubing conveying the circuit medium (10a, 10b) as well as a serpentine-shaped heat conducting element (1).

FIG. 1 shows a cross section through a particularly advantageous embodiment of a latent cold storage device in accordance with the invention (100).

Figure 6:
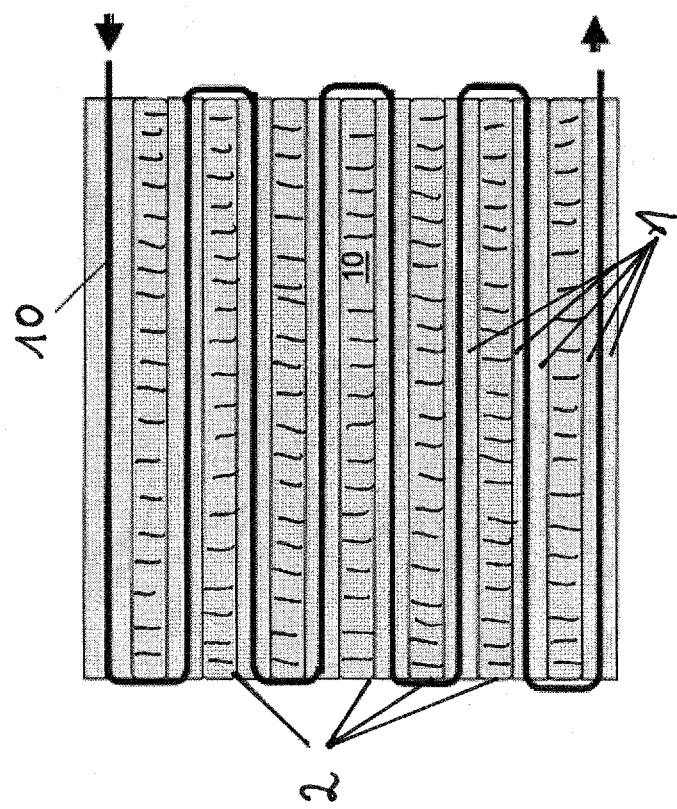
FIG. 6 shows an example of an embodiment of a latent cold storage device according to the invention (100) in a side view with a serpentine-shaped, tube for conveying the circuit medium (10)

The latent cold storage device (100) in this case comprises a plurality of heat conducting elements (1) and a plurality of cold storage elements (2), which are arranged in a sandwich fashion. Respectively, a heat conducting element (1) comprises in this case sections essentially in a plate-shaped arrangement on a plane which are interspersed by fixing devices (1b) of the heat conducting element (1) for tubing (10a, 10b) conveying the circuit medium. In accordance with the size and configuration of the latent cold storage device (100), naturally more or less plate-like sections (1a) or fixing devices (1b) may be useful or required for tubing conveying the circuit medium (10a, 10b) and therefore cold storage elements (2), as shown here.

In this case, the heat conducting elements (1) are advantageously made of aluminium or copper. The use of such a material favours the heat exchange between the tubing (10a, 10b) conveying the circuit medium and the cold storage elements (2) via the plate-like sections (1a)

The cold storage elements (2) in the embodiment shown in FIG. 1 are advantageously arranged or positioned in the area between the plate-like sections (1a) of the heat conducting elements (1) with the plate-like sections (1a) in contact. The number of cold storage elements to be integrated (2) in a plane is determined in this case by the number of plate-shaped sections (1a) of a heat conducting element (1).

In the embodiment shown here of a latent cold storage device(100), the heat conducting elements (1) and the cold storage elements (2) are arranged or stacked vertically in relation to the plate-shaped sections (1a) of the heat conducting elements (1) in alternation, i.e. simply arranged in alternation or stacked. The cold storage elements (2) of the latent cold storage device (100) in FIG. 1 are designed to be deformable and at the same time indestructible, pocket-type packings or to be pockets and contain a cold storage medium (3). The cold storage medium (3) may advantageously be water. Preferentially, in the embodiment shown of the latent cold storage device (100), the cold storage elements (2) are of an essentially cuboid design, in order in this way to allow optimum integration or compression in the areas available between the respective opposing plate-shaped sections (1a) of the relevant heat conducting elements (1).

In order to increase the stability of a cold storage element (2) or of a pocket, as well as by means of the arrangement of such pockets with heat conducting elements (1) of resulting increased stability of the overall design, in at least one pocket of a cold storage element (1) at least one side wall (2a) is integrated, which runs vertically in relation to the plate-shaped sections (1a) of the heat conducting elements (1). The pockets of the cold storage elements (2) are sub-divided by the integrated side walls (2a) in accordance with the position described, in several areas, which however, are filled to capacity with cold storage medium (3).

As shown in FIG. 1, in this case, the heat conducting elements (1) are bent at their outer edges. This results in a boundary for the cold storage elements (2) situated in the external plate-shaped sections (1a) of the heat conducting elements (1). The bent sections (1c) at the outer edges of the heat conducting elements (1) serve however, also for fixing to a structure provided for this purpose on the latent cold storage device (100), which is represented or illustrated more clearly using the embodiment shown in FIG. 2.

Furthermore, in the embodiments shown in FIG. 1 of a latent cold storage device (100), areas (4) or zones are provided, in which there are no cold storage elements (2), no heat conducting elements (1) and no tubing (10a, 10b)conveying circuit medium . These areas (4) offer the cold storage elements (2) sufficient room or space for deformation in the form of expansion for example. Above all, during the charging process of the cold storage elements (2), i.e. during the withdrawal of heat present in the cold storage elements (2) via the plate-shaped sections (1a) of the heat conducting elements (1) or the tubing conveying the circuit medium (10a), an increase in volume of the cold storage medium (3) or of the elastically deformable cold storage elements (2) takes place due to the associated freezing process, which must not be prevented in order to avoid damage of any kind to said components of the latent cold storage device (100).

Charging and/or discharging (heat withdrawal, heat supply) of the cold storage elements (2), as already indicated, will take place via at least one tube (10a, 10b)conveying the circuit medium, which is at least partially connected to the respective heat conducting element (1), on the plate-shaped sections of which (1a) the cold storage elements (2) are situated.

In the embodiment shown in a cross sectional view in FIG. 1 of a latent cold storage device (100), there is one plane between adjacent cold storage elements (2), i.e. between adjacent cold storage elements (2) which are arranged between two heat conducting elements (1), a tube (10a, 10b) conveying circuit medium, which is connected to a heat conducting element (1). As can be seen in FIG. 1, respectively, for this purpose, a heat conducting element (1), two tubes conveying the circuit medium for charging (10a) the appropriate cold storage elements (2) and a tube conveying the circuit medium for discharging (10b) the cold storage elements (2) are provided, which are connected to the heat conducting elements (1) via the relevant, advantageous fixing devices of the heat conducting elements (1) already mentioned and subsequently represented in more detail. Naturally, this type of tubing (10a, 10b) conveying the circuit medium can also be an integral part of the heat conducting element (1), i.e. the embodiment of the heat conducting element (1) and tubing conveying the circuit medium (10a, 10b) would be of an integrated design. This would entail the omission of a fixing device for the tubing (10a, 10b) conveying the circuit medium to the heat conducting elements (1).

FIG. 2 shows a cross section through an embodiment of a latent cold storage device (100) according to the invention, which corresponds to the arrangement of the heat conducting elements (1) and the cold storage elements (2) as shown in FIG. 1. However, the tubing (10a, 10b) conveying the circuit medium shown here in a cross section and also as the circular shaped cross section in FIG. 1 for charging and/or discharging (10a, 10b) the cold storage elements (2) via the plate-shaped sections (1a) of the heat conducting elements (1) in this case are connected, in the embodiment of the latent cold storage device (100) shown, in pairs side by side in the relevant expansion areas (4) of adjacent cold storage elements (2), to the heat conducting elements (1). Furthermore, the latent cold storage device (100) in FIG. 2 comprises among other things a housing (5) enclosing the latent cold storage device (100), which according to the design or arrangement and embodiment of the heat conducting elements (1) and the cold storage elements (2) is of cuboid form and preferably is made of plastic, in order, among other things, to attain a reduction in weight. As can be seen in the embodiment in FIG. 2, in this case, the heat conducting elements are connected by means of their externally located, deformed sections (1c), to two U-shaped brackets functioning as supports (6), via for example, screw, soldered, or welded connections as appropriate. The supports or brackets (6) of the embodiment shown here of the latent cold storage device (100) are connected in this case by means of at least one fixing device in the form of a drilled hole (7) for the fixing or screwing of the latent cold storage device (100) to the housing (5). In FIG. 2, it can also be seen that a material provided above all for insulation, preferably rigid expanded polyurethane, is situated in the respective intermediate areas (8) between the walls of the housing (5) and the surfaces of the relevant cold storage elements (2), heat conducting elements (1), supports (6) or tubing (10a, 10b) conveying the circuit medium.

FIG. 3a shows a cross section of a section of a heat conducting element (1) in the embodiment of a latent cold storage device (100) according to FIG. 1 in an area, wherein the heat conducting element (1) is connected to a tube conveying the circuit medium (10) for charging and/or discharging the cold storage elements (2) (only represented in a rudimentary fashion in FIG. 3a). Outside an area (1b) provided for the purpose for a tube (10) conveying the circuit medium of the heat conducting element (1), the plate-shaped sections (1a) for acceptance of the cold storage elements (2) already illustrated in FIG. 1 can be seen in a rudimentary fashion.

The tubing (10) conveying the circuit medium shown in the embodiment shown in FIG. 3a (and also in FIGS. 1 and 2) displays a circular shaped cross section. The connection of the tubing (10) conveying the circuit medium to the heat conducting element (1) is obtained in this case by compressing the tubing (10) conveying the circuit medium or its relevant surface with the correspondingly shaped sections or areas (1b) of the heat conducting element (1) to be positively interlocking and/or frictionally engaged. The protrusions formed in this way (1d) which extend accordingly over the extent of the tubing (10) conveying the circuit medium, also help connect the tubing (10) conveying the circuit medium to the heat conducting element (1). This type of fixing is simple and quick to accomplish.

FIG. 3b shows the fixing device according to FIG. 3a in greater detail, however, for two adjacent, i.e. side by side, tubes conveying the circuit medium (10a, 10b) for charging and/or discharging the cold storage elements (2).

In FIG. 4, another advantageous embodiment of a latent cold storage device according to the invention (100) is shown in a cross section, which is optimised in terms of the necessary heat exchange processes for charging and/or discharging the latent cold storage elements (2). According to this figure, a heat conducting element (1) is shown which presents a serpentine-shaped design such that the respective plate-shaped sections (1a) of the heat conducting element (1) are arranged parallel to each other at a distance of the height of the cold storage elements (2) or of the pockets. The fixing devices (1b) of the heat conducting element (1) are arranged advantageously with a heat conducting element (1) formed in such a serpentine shape at the lateral, respectively opposing and mutually offset, transfer areas between the plate-shaped sections (1a) and form same respectively. In this way, it is ensured that, apart from the surfaces of the cold storage elements (2) or pockets which are in contact with the plate-shaped sections (1a) of the heat conducting element (1), respectively at least, in addition, one of the side surfaces (2b) of the cold storage units (2) comes into contact with the heat conducting element (1) via the surface of the fixing device (1b) of the heat conducting element (1). In the embodiment shown, advantageously, the tubing (10a) conveying the circuit medium for charging the cold storage elements (2) at the fixing devices (1b) provided for this purpose of the heat conducting element (1) on one side of the serpentine and the tubing (10b) for conveying the circuit medium for discharging the cold storage elements on the other side of the serpentine at the fixing devices (1b) provided for this purpose of the circuit element (1) are of a serpentine-shaped design. In this way, the advantage of an improved mode of operation in terms of the relevant heat exchange processes is achieved. Also, such an embodiment of the latent cold storage device (100) offers the cold storage elements (2) the possibility of expansion, which, as already shown, takes place, for example while charging the cold storage units (2). With the serpentine-shaped design of the heat conducting element (1) with the appropriately arranged tubing (10a, 10b) conveying the circuit medium, in this way, respectively, the thermodynamic active area of a tube conveying the circuit medium (10a, 10b) respectively on two disc shaped plate-shaped sections (1a) of the heat conducting element (1), which during the charging up or charging process and/or the discharging process of the cold storage elements (2) results in an improved, more even temperature distribution in the cold storage elements.

FIG. 5 shows a view of the connection side of a further embodiment of a latent cold storage device (100) according to the invention with heat conducting elements (1) of a serpentine-shaped design, as already shown and described in more detail using the embodiment in FIG. 4 and with integrated cold storage elements (2) between corresponding plate-shaped sections (1a) of the heat conducting elements (1) comprising a cold storage medium (3). The tubing (10a, 10b) conveying the circuit medium for charging and/or discharging the cold storage elements (2), which are situated in this case on one side of the serpentine or of the serpentine-shaped design of the heat conducting elements (1), is arranged respectively at the external end or on the outer edge at the start and at the end of the serpentine-shaped design. Naturally, it would also be conceivable to design the serpentine shape of the heat conducting elements (1) in such a way that the tubing (10a, 10b) conveying the circuit medium is situated on opposite sides.

The serpentine-shaped embodiment of a heat conducting element (1) shown in FIGS. 4 and 5 may also be assigned to the tubing (10) conveying the circuit medium for charging and/or discharging the cold storage elements (2).

FIG. 6 shows a view of a schematically represented embodiment of a latent cold storage device (100) according to the invention, whereby a tube 10 conveying the circuit medium is made according to a serpentine shaped design, so that the heat conducting elements (1) are connected in a heat-conducting manner to the sections at a distance from each other of the serpentine-shaped tubing (10). The tubing (10), which conveys a circuit medium, is in this case in the form of a flat tube and extends accordingly over heat conducting elements (1) or cold storage element (2) comprised by same. Naturally, as in the case of the configuration described in FIG. 5, a parallel arrangement of two tubes (10) conveying the circuit medium in serpentine form would be conceivable.

FIG. 7 shows an advantageous embodiment of the connection of tubing (10) conveying the circuit medium to a common connecting tube (11) via a fixed device consisting of a compression ring (9). The end sections of the relevant tubing (10) conveying the circuit medium are, in this way, inserted in the projections provided by the common connecting tube (11a) and will partly enclose same. A ring situated around the projections (11) is compressed in a positively interlocking manner with same or the surrounding end sections of the tubing (10) conveying the circuit medium of these projections (11) and thereby ensures a leak-tight connection, which compared to expensive welding or soldering processes, can be accomplished simply and rapidly.

FIG. 8 shows a three dimensional representation of an embodiment of a latent cold storage device (100) according to the invention in a perspective view with serpentine-shaped tubing (10a, 10b) conveying the circuit medium and a serpentine-shaped heat conducting element (1). The disc-shaped sections (1a) of the heat conducting element (1) are arranged in this case essentially parallel to each other at a distance of the height of the cold storage elements (2) or pockets. The tubing conveying the circuit medium for charging (10a) and discharging (10b) the cold storage elements (2) situated between the respective disc-shaped sections (1a) of the heat conducting element (1) in this case consists of a serpentine-shaped design and is arranged on opposite sides, i.e. transfer areas of the heat conducting element (1), or connected with same.

In conclusion, it can be established that this invention provides an optimum latent cold storage device, for which the characteristics shown can be combined together in any way.

The invention claimed is:
1. A latent cold storage device (100), in particular for a vertical air conditioning system of a vehicle with a cold storage medium (3), wherein the latent cold storage device (100) comprises a plurality of heat conducting elements (1) having at least one plate-shaped section (1a) and a plurality of cold storage elements (2) wherein the heat conducting elements (1) and the cold storage elements (2) are connected in an alternating sandwich fashion such that at least some cold storage elements (2) abuts two plate-shaped sections (1a), wherein heat is exchanged directly through the abutment between the heat conducting elements (1) and the cold storage elements (2), wherein the cold storage elements (2) are deformable pockets, and wherein at least one tube (10) conveying circuit medium for charging (10a) and/or discharging (10b) the cold storage elements (2) is at least partially connected with the heat conducting elements (1) such that there is a positive interlocking and/or frictional engagement between the tube (10) and the heat conducting element (1), and wherein heat is exchanged directly between the at least one tube (10) and the cold storage elements (2), and directly between the at least one tube (10) and the plate-shaped sections (1a) of the heat conducting elements (1) for further transfer into the cold storage elements (2);

- at least one pair of adjacent cold storage elements (2) having opposed ends forming an expansion area; and
- wherein the at least one tube (10) has a portion that extends adjacent both the at least one expansion area and adjacent at least one of the opposed ends forming the expansion area.

2. A latent cold storage device (100) according to claim 1, whereby the heat conducting element (1) is of a serpentine-shaped design.

3. A latent cold storage device (100) according to claim 1, whereby the heat conducting element (1) comprises at least one protrusion (1d).

4. A latent cold storage device (100) according to claim 1, whereby at least one of the at least one tube (10) is arranged separately from another of the at least one tube (10).

5. A latent cold storage device (100) according to claim 1, whereby the tube (10) is connected via at least one fixing device (9) with at least one connecting tube (11).

6. A latent cold storage device (100) according to claim 5, whereby the fixing device (9) comprises a compression ring.

7. A latent cold storage device (100) according to claim 1, whereby the tube (10) runs in a serpentine shape between at least two cold storage elements (2).

8. A latent cold storage device (100) according to claim 1, whereby the at least one heat conducting element (1) and the at least two cold storage elements (2) are connected to at least one support (6).

9. A latent cold storage device (100) according to claim 8, whereby the support (6) comprises at least one device (7) for fixing to a structure.

10. A latent cold storage device (100) according to claim 1, whereby the heat conducting element (1) is made of aluminum or copper.

11. A latent cold storage device (100) according to claim 1, whereby the pockets are made of plastic.

12. A latent cold storage device (100) according to claim 1, whereby at least one pocket comprises at least one internal partition (2a).

13. A latent cold storage device (100) according to claim 1, which is enclosed in a housing (5).

14. A latent cold storage device (100) according to claim 13, further comprising at least one intermediate area (8) between the housing (5) and the latent cold storage device (100), wherein the intermediate area (8) is made of foam material.

15. A latent cold storage device (100) according to claim 1, whereby the deformable pockets are in the form of an essentially cuboid design.

* * * * *